United States Patent
Flask et al.

(10) Patent No.: US 11,665,396 B2
(45) Date of Patent: May 30, 2023

(54) METHOD AND APPARATUS PROVIDING OUT OF BAND VALIDATION BY CONTENT ANALYSIS IN A CABLE TV NETWORK

(71) Applicant: VIAVI SOLUTIONS INC., San Jose, CA (US)

(72) Inventors: Robert Flask, New Palestine, IN (US); Loren R. Eggert, Indianapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 0 days.

(21) Appl. No.: 17/067,286

(22) Filed: Oct. 9, 2020

(65) Prior Publication Data

US 2022/0116681 A1 Apr. 14, 2022

(51) Int. Cl.
| | |
|---|---|
| H04N 21/442 | (2011.01) |
| H04L 43/08 | (2022.01) |
| H04N 21/438 | (2011.01) |
| H04N 21/61 | (2011.01) |
| H04N 21/84 | (2011.01) |

(52) U.S. Cl.
CPC ....... H04N 21/44209 (2013.01); H04L 43/08 (2013.01); H04N 21/4382 (2013.01); H04N 21/6118 (2013.01); H04N 21/84 (2013.01)

(58) Field of Classification Search
CPC ......... H04N 21/44209; H04N 21/4382; H04N 21/6118; H04N 21/84; H04L 43/08; H04L 43/0894
See application file for complete search history.

(56) References Cited

U.S. PATENT DOCUMENTS

| | | | |
|---|---|---|---|
| 2003/0078006 A1* | 4/2003 | Mahany | H04B 1/707 455/517 |
| 2005/0091697 A1* | 4/2005 | Tanaka | H04N 21/4184 348/553 |
| 2005/0125837 A1* | 6/2005 | Farmer | H04N 7/22 398/71 |
| 2007/0146542 A1* | 6/2007 | Strasser | H04N 21/4181 348/E5.004 |
| 2021/0392176 A1* | 12/2021 | Rozenberg | H04L 65/4076 |

* cited by examiner

*Primary Examiner* — Adil Ocak
(74) *Attorney, Agent, or Firm* — DLA Piper LLP (US)

(57) ABSTRACT

A method and test instrument for validating one or more out of band (OOB) channels in a CATV network, particularly one having a Remote PHY architecture. The method and test instrument may quickly and efficiently determine if an OOB channel is carrying valid data and is therefore "active."

20 Claims, 5 Drawing Sheets

| | OOB Channel Check | | |
|---|---|---|---|
| Freq (MHz) | Lock | SNR (dB) | Status |
| 73.250 | YES | 30.1 | ACTIVE |
| 104.250 | YES | 29.7 | ACTIVE |

METHOD AND APPARATUS PROVIDING OUT OF BAND VALIDATION BY CONTENT ANALYSIS IN A CABLE TV NETWORK

BACKGROUND

The cable space is rapidly embracing the Remote PHY (also known as R-PHY, R PHY, and RPHY) network architecture. Remote PHY is popular among cable television (CATV) network service providers because it does an effective job of alleviating the rack space, power, and cooling constraints in the hub of the network. Remote PHY does this by separating out the PHY layer and redistributing it out to the fiber node. Remote PHY specifications exist and have become the standard for the industry.

Remote PHY is part of a larger family of technologies known as distributed access architectures (DAA), which alleviate congestion in the hub. In general, DAA technologies such as Remote PHY virtualize and move certain aspects of a network out of the hub and closer to subscribers. Hubs are evolving from housing row after row of specialized equipment and RF splitting/combining networks, into potentially little more than a small collection of optical switches and routers.

In addition to reducing space, power and cooling requirements in the hub, Remote PHY also eliminates the analog optical link and replaces it with a commodity digital 10G Ethernet link. This provides distinct advantages such as e.g., 1) a digital link is easier to set up, taking less time to deploy; 2) the link is more reliable, requiring less maintenance and manpower in the future; and 3) significant signal to noise ratio (SNR) gains may be achieved using digital optical links versus the old amplitude modulated links, potentially enabling higher modulation orders for DOCSIS (Data Over Cable Service Interface Specification) 3.1 downstreams. Technologies such as Remote PHY and DOCSIS 3.1 are extending the life of the hybrid fiber coax (HFC) plant by leveraging much of the existing infrastructure to deliver Gigabit speeds.

In the traditional network architecture, all of the RF is generated or received in a headend or hubsite. This provides a centralized place where tests can be performed. If the content of the signals is ensured in the headend/hubsite then the measurements out in the field really only need to validate the physical layer integrity to ensure that the appropriate content is reaching the end user. The Remote PHY network architecture changes this. In this environment, the RF signals are no longer generated in a centralized place, but rather the creation is distributed out closer to the network edge; typically at the node. This requires that the testing is also performed out at the node to ensure that the signals are correct.

Figure 1:
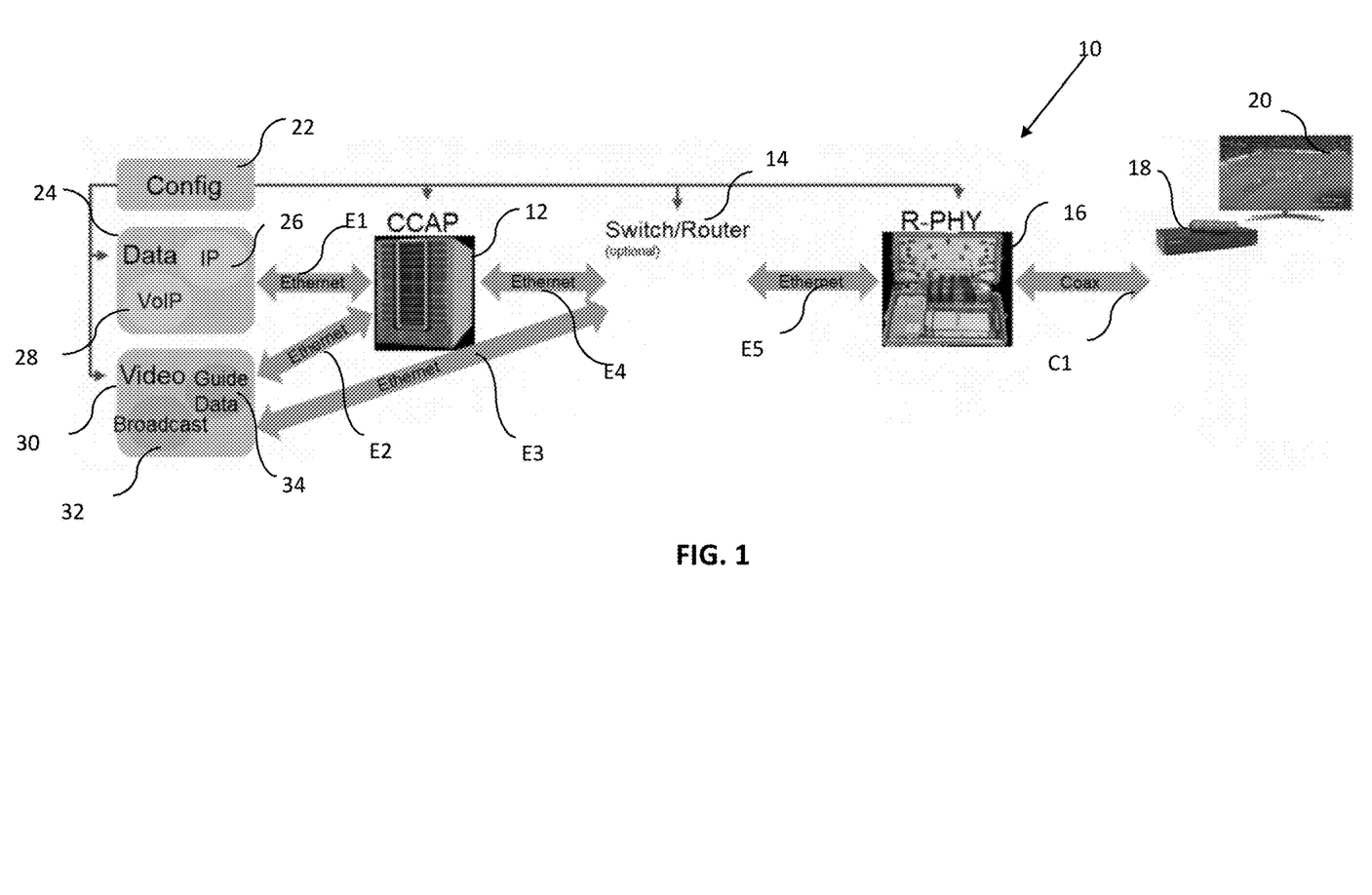
FIG. 1 shows an example CATV network having a Remote PHY architecture.

FIG. 1 illustrates an example CATV network 10 having a Remote PHY architecture. Specifically, the network 10 includes a converged cable access platform (CCAP) device 12, switch/router 14, Remote PHY device (RPD) 16 and a set-top box 18. In the illustrated example, a user's television 20 is connected to the set-top box 18 to display video 30 that may include broadcast audio and video 32 (e.g., programs) and a user guide based on guide data 34. In the illustrated example, configuration data 22 is used to configure the CCAP device 12, switch/router 14, and RPD 16. Data 28, which may include Internet Protocol (IP) data 26 and or voice over IP (VoIP) data 28 may be received by the CCAP device 12.

In the illustrated example, the network 10 may utilize QAM (quadrature amplitude modulation) and MPEG (Moving Picture Experts Group) transport streams to deliver the data 24 and video 30 to the RPD 16 through one or more Ethernet connections E1-E5 and deliver the data 24 and video 30 to the set-top box 18 from the RPD 16 through e.g., a coaxial connection C1. It should be appreciated that the switch/router 14 may not be required, meaning that the CCAP device 12 could be connected directly to the RPD 16, if desired. The network 10 may also transmit certain information (e.g., control, guide data) in one or more out of band (OBB) channels, typically used by the set-top box 18.

As can be seen, there are many network elements must be configured properly for the guide data 34 to be delivered and correctly modulated into the out of band channel. If any one component is misconfigured or not functioning properly the resulting OOB RF channel may contain only filler data and will therefore be unusable by the set-top boxes 18. Accordingly, there is a need and desire for a test that can quickly and accurately determine if an OOB channel is carrying valid data and is therefore "active."

SUMMARY

Embodiments described herein may include a method and test instrument for validating one or more out of band (OOB) channels in a CATV network, particularly one having a Remote PHY architecture. For example, the embodiments described herein may be configured to quickly and efficiently determine if an OOB channel is carrying valid data and is therefore "active."

In one embodiment, a computer-implemented method is provided. The method is performed on a test instrument adapted to test an out of band (OOB) channel in a downstream portion of a cable television network having a Remote PHY architecture. The method comprises: demodulating the captured OOB channel data; extracting OOB content from the demodulated OOB channel data; determining whether the OOB content includes a predetermined amount of valid data; and determining that the OOB channel is active when it is determined that the OOB content includes the predetermined amount of valid data.

In another embodiment, a test instrument for testing an out of band (OOB) channel in a downstream portion of a cable television network having a Remote PHY architecture is provided. The test instrument comprises a storage device; and a processor executing program instructions stored in the storage device and being configured to capture OOB channel data transmitted in the downstream portion of the network; demodulate the captured OOB channel data; extract OOB content from the demodulated OOB channel data; determine whether the OOB content includes a predetermined amount of valid data; and determine that the OOB channel is active when it is determined that the OOB content includes the predetermined amount of valid data.

DETAILED DESCRIPTION OF SEVERAL EMBODIMENTS

The disclosed principles provide a method and test instrument for validating one or more out of band (OOB) channels in a CATV network, particularly one having a Remote PHY architecture. In one or more embodiments, the disclosed method and test instrument may combine a full software demodulation and extraction of transport layer data with an analysis of said transport layer to determine if an OOB RF channel is "active" (i.e., actually carrying valid data) or not (i.e., simply stuffed with filler data to maintain the required constant bitrate transmission).

Figure 2:
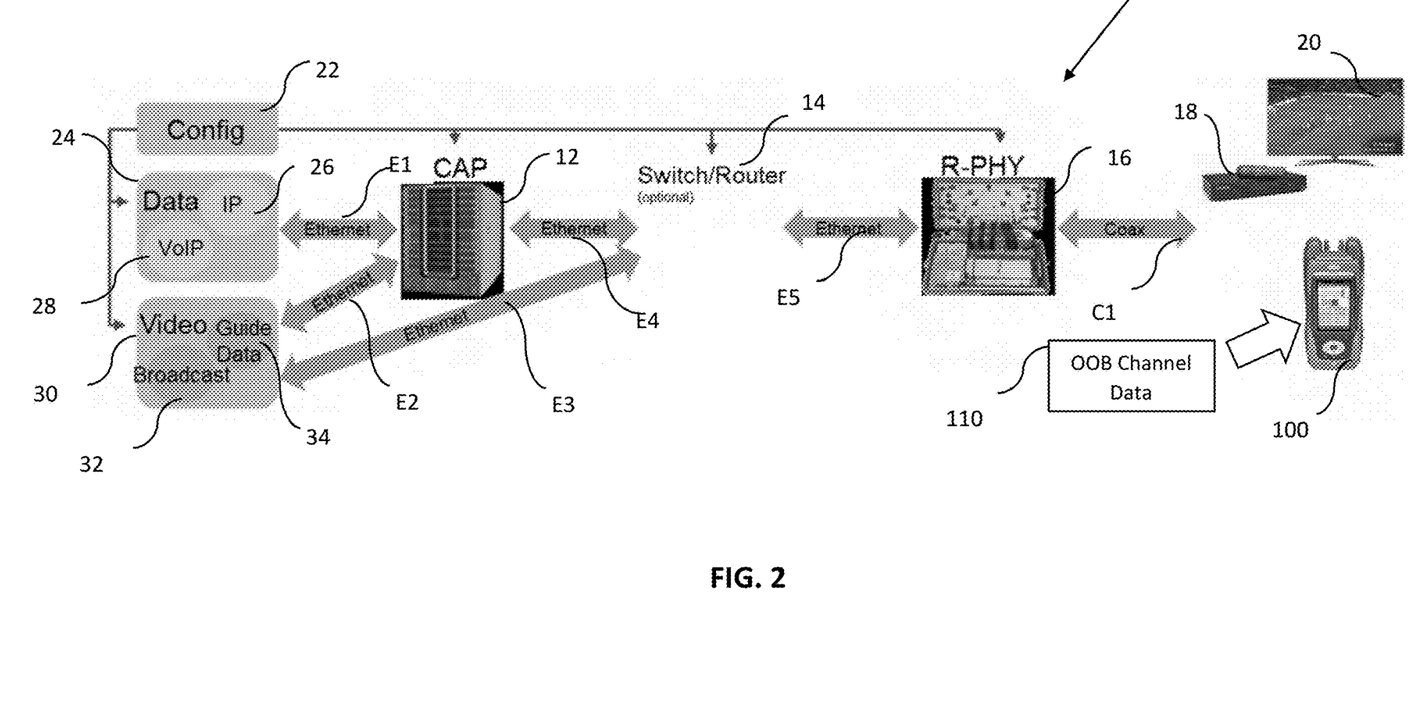
FIG. 2 shows the example CATV network of FIG. 1 being tested by a test instrument in accordance with the disclosed principles.

For example, FIG. 2 shows the CATV network 10 of FIG. 1 being tested by a test instrument 100 in accordance with the disclosed principles. In the illustrated embodiment, the test instrument 100 is connected on the Remote PHY side of the network (e.g., at the RPD device 16, the user's premises, etc.) and will capture, among other things, out of band (OOB) channel data 110 transmitted in the downstream direction over e.g., the coaxial connection C1. In one or more embodiments the OOB channel data 110 is collected by the test instrument 100, which may analyze the data to verify its contents to determine if the OOB channel or channels are active (i.e., carrying valid data) or not (i.e., simply stuffed with filler data to maintain the required constant bitrate transmission). This is a feature that is not currently being done by test instruments and thus provides a huge advantage in the technical field.

Figure 3:
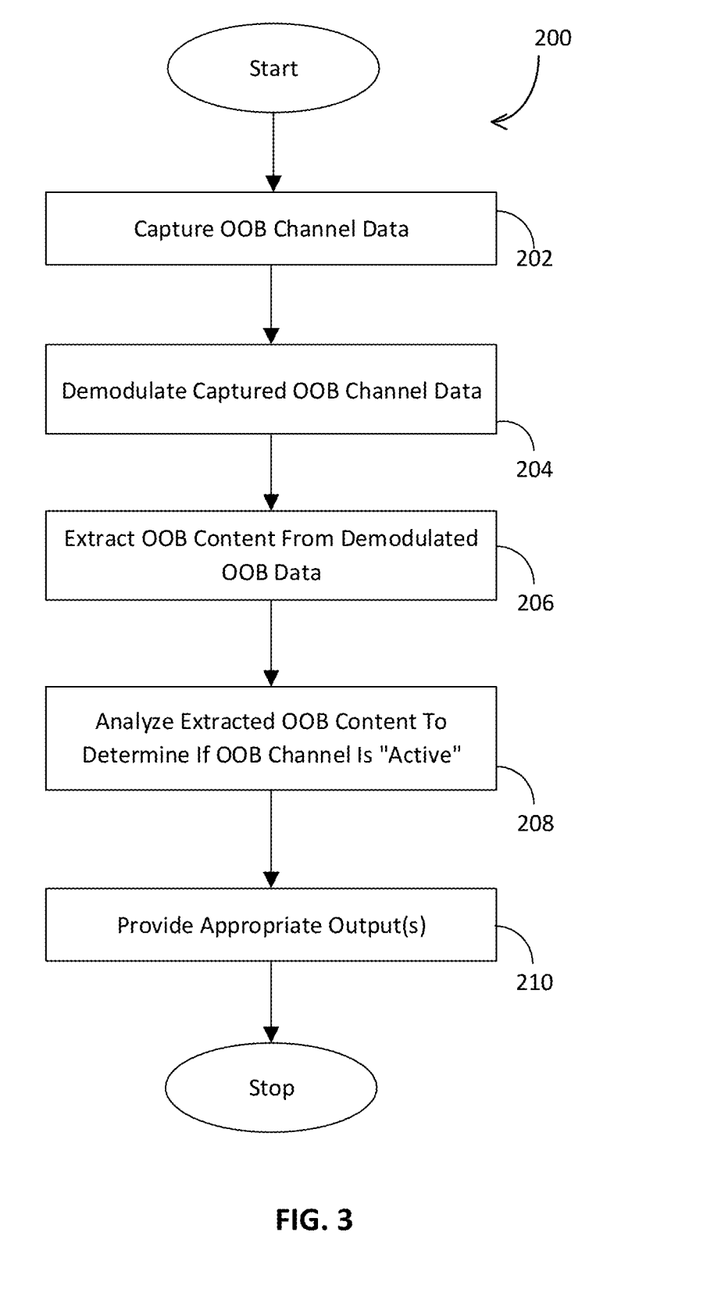
FIG. 3 shows an example method of validating one or more out of band (OOB) channels in accordance with the disclosed principles.

FIG. 3 shows an example method 200 of validating one or more OOB channels in accordance with the disclosed principles. In one or more embodiments, the method is performed by the test instrument 100. In one embodiment, the test instrument 100 is one of the OneExpert CATV line of analysis meters manufactured and sold by VIAVI Solutions Inc. that is modified to perform the method 200 and other processing disclosed herein. In one or more embodiments, the modifications can be made to the OneExpert analysis meter by a software/firmware upgrade. In one embodiment, the method 200 may be activated by a technician and performed as part of an "OOB Channel Check" feature or other feature (e.g., "OneCheck") performed by the test instrument 100. The method 200 may be activated using one or more buttons or a touchscreen included with the instrument 100 (described below in more detail with respect to FIG. 5). Regardless of how it is activated, the method 200 should be executed after the test instrument 100 is connected to a tap on the Remote PHY side of the network 10.

At step 202, the test instrument 100 captures OOB channel data transported downstream (e.g., to a customer's premises). At step 204, the captured OOB channel is, among other things, demodulated so that the test instrument 100 can extract and subsequently analyze the contents of the data transmitted to the set-top box 18 in the OOB channel(s). As is known in the art, there are different approaches to passing OOB signals through a Remote PHY device. Two specifications referred to as SCTE (Society of Cable and Telecommunications Engineers) 55-1 and SCTE 55-2 govern two of these approaches for existing legacy devices. Each specification outlines how the OOB data is transported. For example, SCTE 55-1 mandates that the data be transmitted in the downstream direction using MPEG transport streams. SCTE 55-2, on the other hand, mandates that the data be transmitted in the downstream direction using asynchronous transfer mode (ATM) cells (referred to herein as a "stream of ATM cells").

Each specification also describes how the data is formatted and modulated in the downstream direction. For example, SCTE 55-1 has a physical layer whereby the data undergoes QPSK (quadrature phase shift keying)/differential encoding, interleaving, reed-solomon encoding and randomization in a specified manner to create a MAC (medium access control) sublayer having MAC packets and the MPEG transport stream as is known in the art. In contrast, SCTE 55-2 has a link/physical layer to create SL-ESF (signaling link extended superframe format) frame payload structures having an SL-ESF format whereby the data undergoes QPSK/differential encoding, interleaving, reed-solomon encoding, and randomization in a specified manner to create the stream of ATM cells as is known in the art. Thus, the manner in which the "demodulation" at step 204 is performed will be specification specific and the result of step 204 is referred to herein as "demodulated OOB data."

At step 206, the test instrument 100 will extract the OOB content to be analyzed (e.g., MPEG transport stream data, ATM cell data) from the demodulated OOB data. Since each specification uses different formats and data structures, the OOB content to be extracted and step 206 will also be specification specific. For example, an MPEG transport stream packet has a packet size of 188 bytes containing a four byte header followed by 184 bytes of data payload. ATM cells, on the other hand, are 53 bytes long and have 40 bits of header and 384 bits of payload.

The headers can be used to "lock" onto the MPEG transport stream/stream of ATM cells prior to data extraction and analysis. For example, for the MPEG transport stream, the synchronization portion of the packet header may be detected and the test instrument 100 may ensure that it detects additional packets every 188 bytes. If it does, the test instrument 100 has locked onto the MPEG transport stream data and the method 200 may continue. Likewise, for ATM cells, the detection of the Frame Alignment Signal (FAS) within the SL-ESF framing structure may be used to determine "sync lock." Then, the test instrument 100 may ensure that it detects additional packets every 53 bytes. If it does, the test instrument 100 has locked onto the ATM cell data and the method 200 may continue. If the test instrument 100 cannot lock on to the MPEG stream or stream of ATM cells, the method 200 may output an alert (e.g., audible, visual, haptic, etc.) so that the technician knows that there is an error. At this point, the method 200 may terminate.

At step 208, the test instrument 100 may analyze the extracted OOB content (i.e., MPEG transport stream packets/ATM cells) to determine if the OOB channel is "active" (e.g., carrying valid data) or not (e.g., carrying filler or no data). For example, MPEG transport stream packets are identified by a packet identifier (PID). As is known in the art, a packet having a PID of 8191, is a NULL packet. In accordance with the disclosed principles, NULL packets are not packets having valid data at step 208 (i.e., they are considered to contain invalid data). In one or more embodiments, the number of packets comprising valid data (i.e., packets having non-NULL data) is compared to the number of analyzed packets. In one or more embodiments, if the ratio of packets having valid data to overall packets is greater than a predetermined threshold, then the OOB channel is determined to be active. Otherwise, the OOB channel is determined to be inactive. In one or more embodiments, the threshold can be at least 25%. It should be appreciated, however, that the threshold could be higher, requiring a larger percentage of packets with valid data to be received on the OOB channel, or lower, requiring a lower percentage of packets with valid data to be received on the OOB channel, and may be application/network specific.

In one or more embodiments, the number of packets having valid data (i.e., packets having non-NULL data) is compared to the number of packets having invalid data (i.e., packets having NULL data). In one or more embodiments, if the ratio of packets having valid data to packets having invalid data is greater than a predetermined threshold, then the OOB channel is determined to be active. Otherwise, the OOB channel is determined to be inactive. In one or more embodiments, the threshold can be at least 50%. It should be appreciated, however, that the threshold could be higher, requiring a larger percentage of packets with valid data to be received on the OOB channel, or lower, requiring a lower percentage of packets with valid data to be received on the OOB channel, and may be application/network specific.

For an SCTE 55-2 configuration, the test instrument 100 must analyze the ATM cell data to determine if the OOB channel is "active" or not. For example, ATM cells may contain data or they may be unassigned. In accordance with the disclosed principles, an unassigned ATM cell is considered to not contain valid data at step 208 (i.e., it is considered to contain invalid data). In one or more embodiments, the number of ATM cells with data is compared to the number of analyzed ATM cells. In one or more embodiments, if the ratio of ATM cells having data to overall ATM cells analyzed is greater than a predetermined threshold, then the OOB channel is determined to be active. Otherwise, the OOB channel is determined to be inactive. In one or more embodiments, the threshold can be at least 25%. It should be appreciated, however, that the threshold could be higher, requiring a larger percentage of ATM cells with data to be received on the OOB channel, or lower, requiring a lower percentage of ATM cells with data to be received on the OOB channel, and may be application/network specific.

In one or more embodiments, the number of ATM cells with data is compared to the number of unassigned ATM cells. In one or more embodiments, if the ratio of ATM cells having data to unassigned ATM cells is greater than a predetermined threshold, then the OOB channel is determined to be active. Otherwise, the OOB channel is determined to be inactive. In one or more embodiments, the threshold can be at least 50%. It should be appreciated, however, that the threshold could be higher, requiring a larger percentage of ATM cells with valid data to be received on the OOB channel, or lower, requiring a lower percentage of ATM cells with valid data to be received on the OOB channel, and may be application/network specific.

At this point, the OOB channel is either validated (i.e., determined to be active) or not validated (i.e., determined to be inactive). Thus, at step 210, the test instrument may provide an appropriate indication of the result of the OOB channel check. For example, the test instrument 100 can provide one or more visual, audio and or haptic indications alerting the technician that the OOB channel validation has been completed. These indications can also include a result of the validation (i.e., channel active or inactive), a listing of packets/ATM cells analyzed, packets with valid data/ATM cells with data, and or packets with NULL data/unassigned ATM cells that were used to determine if one or more OOB channels were active or not. As with other indications provided by the test instrument 100, there is no limit or restrictions on the type of indication used at step 210.

Figure 4:
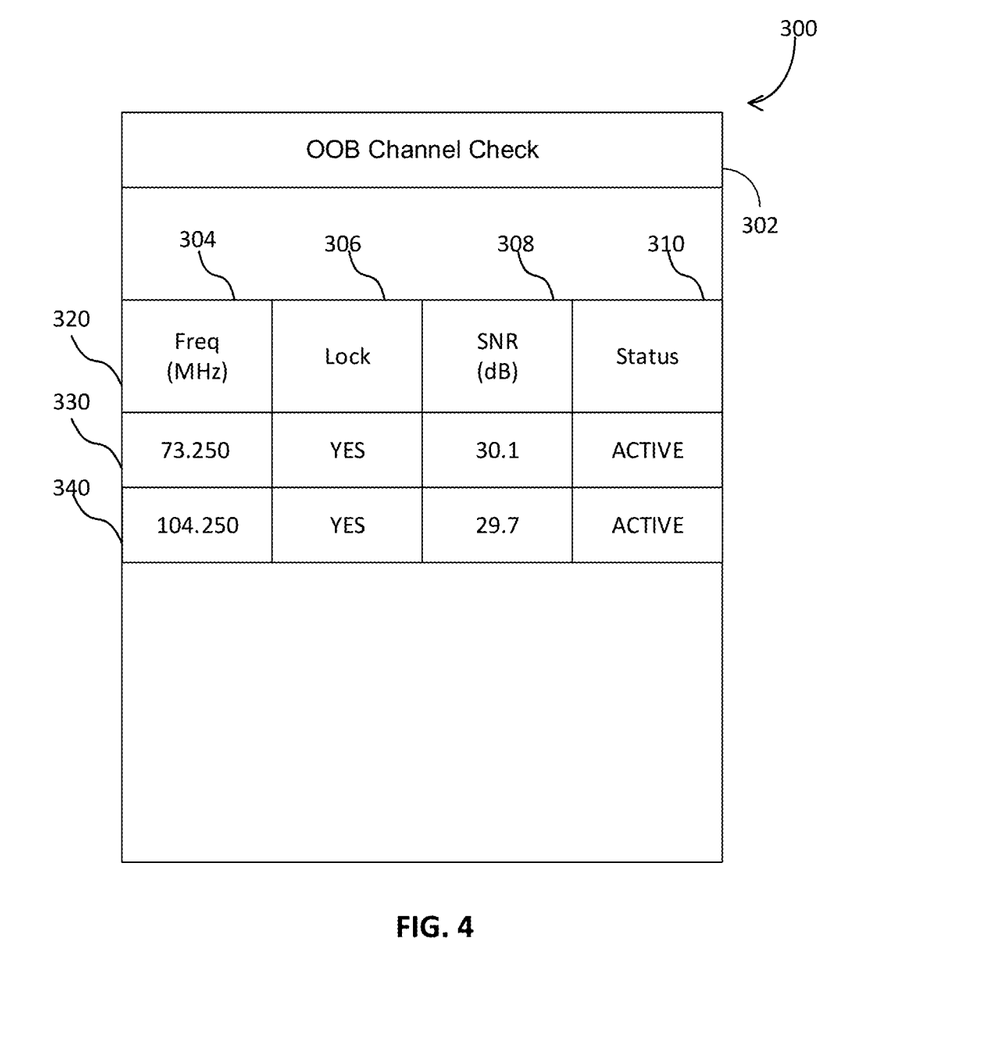
FIG. 4 shows an example user interface that may be output during the method illustrated in FIG. 3.

FIG. 4 shows an example user interface 300 that may be output by the test instrument 100 during the method 200 illustrated in FIG. 3. In the illustrated example, it is presumed that the user/technician has navigated the appropriate test instrument function keys, menu items and or soft keys to an "OOB Channel Check function" as indicated by field 302. In the illustrated example, the user interface 300 includes multiple columns 304, 306, 308, 310 and rows 320, 330, 340 describing and or outputting certain aspects of the OOB channel check function.

For example, the first column 304 is used to identify the frequency of the OOB channel(s) tested. Row 320 includes the label "Freq (MHz)" in column 304, row 330 shows a first OOB channel that was tested and that has a 73.250 MHz frequency and row 340 shows a second OOB channel that was tested and that has a 104.250 MHz frequency.

In the illustrated example, the second column 306 is used to identify whether the test instrument 100 was able to "lock" on to the MPEG transport stream (e.g., for a set-top box following SCTE 55-1) or ATM cells (e.g., for a set-top box following SCTE 55-2). In this example, row 320 includes the label "Lock" in column 306. As noted above with respect to step 206 of method 200, the inability to lock on to the MPEG transport stream or ATM cells may result in the method 200 being terminated without reaching the validation step (step 208), which is an error that should be reported to the technician. In the illustrated example, rows 330 and 340 indicate that the test instrument 100 was able to lock on to the MPEG transport stream or ATM cells by displaying the text "YES" in column 306. It should be appreciated that if the test instrument 100 could not lock on to the MPEG transport stream or ATM cells, a "NO" would appear in row 330 and or row 340.

In the illustrated example, the third column 308 is used to identify the signal-to-noise ratio (SNR) of the OOB channel(s) tested. Row 320 includes the label "SNR (dB)" in column 308, row 330 shows that the first OOB channel has a signal-to-noise ratio of 30.1 dB and row 340 shows that the second OOB channel has a signal-to-noise ratio of 29.7 dB.

In the illustrated example, the fourth column 310 is used to indicate whether the test instrument 100 determined the OOB channel(s) to be active or not. This is indicated by row 320, which includes the label "Status" in column 310. Row 330 shows that the first OOB channel was determined to be active via the label "ACTIVE." Similarly, row 340 shows that the second OOB channel was determined to be active via the label "ACTIVE." It should be appreciated that if the test instrument 100 determined the OOB channel(s) to be inactive, the label "INACTIVE" would appear in row 330 and or row 340.

It should be appreciated that the user interface could include other information, if desired. For example with respect to an SCTE 55-1 configuration, the user interface 300 could include fields listing the number of MPEG packets analyzed during the test, the number of packets with valid data, and or the number of packets with NULL data, to name a few. With respect to an SCTE 55-2 configuration, the user interface 300 could include fields listing the number of ATM cells analyzed during the test, the number of ATM cells with data, and or the number of unassigned ATM cells, to name a few.

Figure 5:
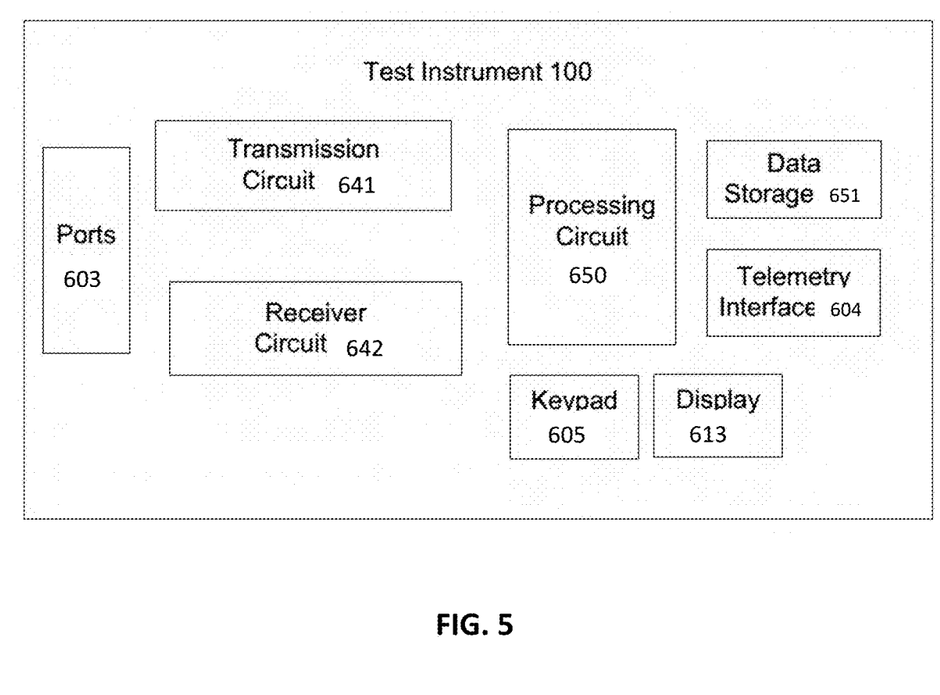
FIG. 5 shows a test instrument for validating one or more out of band (OOB) channels in accordance with the disclosed principles.

FIG. 5 shows a high-level block diagram of the test instrument 100, according to an example embodiment. It should be appreciated that the test instrument 100 may include components other than those shown. The test instrument 100 may include one or more ports 603 for connecting the test instrument 100 to a tap within the network 10 shown in FIG. 2. The one or more ports 603 may include connectors for connecting to cables in the network that carry traffic for upstream and downstream channels. The traffic may include the MPEG stream and packets (or ATM cells) discussed herein as well as other data. The test instrument 100 may include a telemetry interface 604 for connecting to a telemetry channel, such as a WiFi interface, Bluetooth interface, cellular interface or another network interface. The test instrument 100 may connect to a remote device via the telemetry interface 604.

The test instrument 100 may include a user interface, which may include a keypad 605 and display 613. The display 613 may include a touch screen display. A user may interact with the test instrument 100, such as to enter information, select operations, view measurements, view outcomes of the 00B channel validations disclosed herein, via the user interface.

A data storage 651 may store any information used by the test instrument 100 and may include memory or another type of known data storage device. The data storage 651 may store measured signal data, MPEG (or ATM cells) and or other content or data used by the test instrument 100, particularly the data required for method 200. The data storage 651 may include a non-transitory computer readable medium storing machine-readable instructions executable by processing circuit 650 to perform operations of the test instrument 100 such as those described for method 200.

Transmission circuit 641 may include a circuit for sending test signals upstream to perform various tests, such as frequency sweep tests. The transmission circuit 641 may include encoders, modulators, and other known component for transmitting signals within the network. Receiver circuit 642 may include components for receiving signals from the network. The components may include components such as a demodulator, decoder, analog-to-digital converters, and other known components suitable for a receiver circuit.

Processing circuit 650 may include any suitable hardware to perform the operations of the test instrument 100 described herein, including the operations described with respect to FIGS. 3-4 and method 200 described herein. The hardware of the test instrument 100, including the processing circuit 650, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 650 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The method 200 and test instrument 100 disclosed herein provides numerous advantages over the current state of the art. In particular, the discloses principles allow a handheld field instrument to validate one or more OOB channels in a CATV network, particularly one having a Remote PHY architecture. This analysis is simply not performed out in the field; attempts to do so without the disclosed method and test instrument would require running a drop from the RPD 16 to a truck and using lab/bench type equipment out in the field. This process would be cumbersome, expensive and would take a large amount of time, all of which are undesirable. As such, method 200 and test instrument 100 disclosed herein provide a technical solution to a technical problem, particularly in the CATV network and analysis fields.

In addition, no additional hardware is needed to carry out the method 200 disclosed herein—i.e., no additional hardware is required to modify the test instrument's hardware or the network Remote Phy architecture. In one or more embodiments, the method 200 may be ported to pre-existing test instruments as part of a software upgrade. No board spin or additional product cost would be required to implement the disclosed principles. This means that the disclosed principles may be deployed on tens of thousands of test instruments that are already deployed in the field.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed on a test instrument adapted to test an out of band (OOB) channel in a downstream portion of a cable television network having a Remote PHY architecture, said method comprising:
   capturing, by the test instrument, OOB channel data transmitted in the downstream portion of the network;
   demodulating, by the test instrument, the captured OOB channel data; extracting, by the test instrument, OOB content from the demodulated OOB channel data;
   determining, by the test instrument, whether the OOB content includes a predetermined amount of valid data based on a detected packet identifier or includes filler data to maintain a constant bitrate transmission;
   determining, by the test instrument, that the OOB channel is active in response to determining that the OOB content includes the predetermined amount of valid data; and
   determining, by the test instrument, that the OOB channel is inactive in response to determining that the OOB content includes the filler data to maintain the constant bitrate transmission.

2. The method of claim 1, wherein the OOB channel data is transmitted using a Moving Picture Experts Group (MPEG) transport stream formatted and modulated in accordance with a Society of Cable and Telecommunications Engineers (SCTE) 55-1 specification and demodulating the captured OOB channel data comprises demodulating the MPEG transport stream to obtain a demodulated MPEG transport stream.

3. The method of claim 2, wherein extracting the OOB content from the demodulated OOB channel data comprises:
    extracting, by the test instrument, MPEG packets from the demodulated MPEG transport stream.

4. The method of claim 3, wherein determining that the OOB content includes the predetermined amount of valid data comprises:
    detecting, by the test instrument, at least one packet identifier of packets within the extracted MPEG packets;
    counting, by the test instrument, a number of packet identifiers associated with valid data; and
    determining, by the test instrument, that a ratio of the number of packet identifiers associated with valid data to a number of packets extracted from the MPEG transport stream is greater than a predetermined threshold.

5. The method of claim 3, wherein determining that the OOB content includes the predetermined amount of valid data comprises:
    detecting, by the test instrument, at least one packet identifier of packets within the extracted MPEG packets;
    counting, by the test instrument, a number of packet identifiers associated with valid data;
    counting, by the test instrument, a number of packet identifiers associated with invalid data; and
    determining, by the test instrument, that a ratio of the number of packet identifiers associated with valid data to the number of packet identifiers associated with invalid data is greater than a predetermined threshold.

6. The method of claim 1, wherein the OOB channel data is transmitted using a stream of asynchronous transfer mode (ATM) cells formatted and modulated in accordance with a Society of Cable and Telecommunications Engineers (SCTE) 55-2 specification and demodulating the captured OOB channel data comprises demodulating the stream of ATM cells to obtain a demodulated stream of ATM cells.

7. The method of claim 6, wherein extracting the OOB content from the demodulated OOB channel data comprises:
    extracting, by the test instrument, ATM cells from the demodulated stream of ATM cells.

8. The method of claim 7, wherein determining that the OOB content includes the predetermined amount of valid data comprises:
    counting, by the test instrument, a number of ATM cells comprising data within the extracted ATM cells; and
    determining, by the test instrument, that a ratio of the number of ATM cells comprising data to a number of ATM cells extracted from the stream of ATM cells is greater than a predetermined threshold.

9. The method of claim 7, wherein determining that the OOB content includes the predetermined amount of valid data comprises:
    counting, by the test instrument, a number of ATM cells comprising data within the extracted ATM cells;
    counting, by the test instrument, a number of unassigned ATM cells within the extracted ATM cells; and
    determining, by the test instrument, that a ratio of the number of ATM cells comprising data to the number of unassigned ATM cells is greater than a predetermined threshold.

10. The method of claim 1, further comprising determining that the OOB channel is not active when it is determined that the OOB content does not include the predetermined amount of valid data.

11. A test instrument for testing an out of band (OOB) channel in a downstream portion of a cable television network having a Remote PHY architecture, said test instrument comprising:
    a storage device; and
    a processor executing program instructions stored in the storage device and being configured to:
    capture OOB channel data transmitted in the downstream portion of the network;
    demodulate the captured OOB channel data;
    OOB content from the demodulated OOB channel data;
    determine whether the OOB content includes a predetermined amount of valid data based on a detected packet identifier or includes filler data to maintain a constant bitrate transmission;
    determine that the OOB channel is active in response to determining that the OOB content includes the predetermined amount of valid data; and
    determine that the OOB channel is inactive in response to determining that the OOB content includes the filler data to maintain the constant bitrate transmission.

12. The test instrument of claim 11, wherein the OOB channel data is transmitted using a Moving Picture Experts Group (MPEG) transport stream formatted and modulated in accordance with a Society of Cable and Telecommunications Engineers (SCTE) 55-1 specification and the processor demodulates the captured OOB channel data by demodulating the MPEG transport stream to obtain a demodulated MPEG transport stream.

13. The test instrument of claim 12, wherein the processor extracts the OOB content from the demodulated OOB channel data by:
    extracting MPEG packets from the demodulated MPEG transport stream.

14. The test instrument of claim 13, wherein the processor determines that the OOB content includes the predetermined amount of valid data by:
    detecting at least one packet identifier of packets within the extracted MPEG packets;
    counting a number of packet identifiers associated with valid data; and
    determining that a ratio of the number of packet identifiers associated with valid data to a number of packets extracted from the MPEG transport stream is greater than a predetermined threshold.

15. The test instrument of claim 13, wherein the processor determines that the OOB content includes the predetermined amount of valid data by:
    detecting at least one packet identifier of packets within the extracted MPEG packets;
    counting a number of packet identifiers associated with valid data;
    counting a number of packet identifiers associated with invalid data; and
    determining that a ratio of the number of packet identifiers associated with valid data to the number of packet identifiers associated with invalid data is greater than a predetermined threshold.

16. The test instrument of claim 11, wherein the OOB channel data is transmitted using a stream of asynchronous transfer mode (ATM) cells formatted and modulated in accordance with a Society of Cable and Telecommunications Engineers (SCTE) 55-2 specification and the processor demodulates the captured OOB channel data by demodulating the stream of ATM cells to obtain a demodulated stream of ATM cells.

17. The test instrument of claim 16, wherein the processor extracts the OOB content from the demodulated OOB channel data by:
   extracting ATM cells from the demodulated stream of ATM cells.

18. The test instrument of claim 17, wherein the processor determines that the OOB content includes the predetermined amount of valid data by:
   counting a number of ATM cells comprising data within the extracted ATM cells; and
   determining that a ratio of the number of ATM cells comprising data to a number of ATM cells extracted from the stream of ATM cells is greater than a predetermined threshold.

19. The test instrument of claim 17, wherein the processor determines that the OOB content includes the predetermined amount of valid data by:
   counting a number of ATM cells comprising data within the extracted ATM cells;
   counting a number of unassigned ATM cells within the extracted ATM cells; and
   determining that a ratio of the number of ATM cells comprising data to the number of unassigned ATM cells is greater than a predetermined threshold.

20. The test instrument of claim 11, wherein the processor is further configured to determine that the OOB channel is not active in response to determining that the OOB content does not include the predetermined amount of valid data.

* * * * *